(12) United States Patent
Hebbar et al.

(10) Patent No.: US 9,645,893 B1
(45) Date of Patent: May 9, 2017

(54) METHOD AND SYSTEM FOR FILE RECOVERY USING ENHANCED BACKUP DATABASE INDEXING

(71) Applicant: EMC Corporation, Hopkinton, MA (US)

(72) Inventors: Manjunatha Hebbar, Bangalore Karnataka (IN); Vaibhav Khanduja, Cupertino, CA (US); Kiran Bachu, Cupertino, CA (US); Srinivasan Ramachandran, Bangalore Karnataka (IN)

(73) Assignee: EMC IP Holding Company LLP, Hopkinton, MA (US)

( * ) Notice: Subject to any disclaimer, the term of this patent is extended or adjusted under 35 U.S.C. 154(b) by 178 days.

(21) Appl. No.: 13/630,442

(22) Filed: Sep. 28, 2012

(51) Int. Cl.
  *G06F 17/30* (2006.01)
  *G06F 11/14* (2006.01)
(52) U.S. Cl.
  CPC .................. *G06F 11/1469* (2013.01)
(58) Field of Classification Search
  CPC .................................. G06F 11/1469
  USPC ......................................... 707/770
  See application file for complete search history.

(56) References Cited

U.S. PATENT DOCUMENTS 7,966,293 B1* 6/2011 Owara et al. ................. 707/654
8,600,953 B1 12/2013 Gerber
2003/0158861 A1* 8/2003 Sawdon et al. ............... 707/200
2007/0226219 A1* 9/2007 Hwang et al. ..................... 707/8
2012/0254140 A1* 10/2012 Srinivasaraghavan
  .......................... G06F 17/30215
  707/705
2012/0296944 A1* 11/2012 Thelen .......................... 707/822

OTHER PUBLICATIONS

Final Office Action, U.S. Appl. No. 13/630,420, dated Nov. 4, 2014, 21 pages.
Non-Final Office Action, U.S. Appl. No. 13/630,420, dated Sep. 22, 2014, 18 pages.
Non-Final Office Action, U.S. Appl. No. 13/630,420, dated May 6, 2015, 22 pages.

* cited by examiner

*Primary Examiner* — Apu Mofiz
*Assistant Examiner* — Dara J Glasser
(74) *Attorney, Agent, or Firm* — Blakely Sokoloff Taylor & Zafman LLP

(57) ABSTRACT

A method and system for implementing enhanced indexing in a backup system as well as manage file recovery. The method implemented at a backup server receives a filename from a client to be retrieved from a backup system and queries the filename on a directory records database. As a query return, a directory record is received including a savetime identifying a backup instance and an inode of a directory for the filename of the requested file. The process then queries the inode on a node records database and receives at least one node record where the node record has the inode of the directory record as a parent.

17 Claims, 5 Drawing Sheets

DATABASE SCHEMA DIAGRAM

METHOD AND SYSTEM FOR FILE RECOVERY USING ENHANCED BACKUP DATABASE INDEXING

CROSS-REFERENCE TO RELATED APPLICATION

Cross-reference is made to a co-pending patent entitled "METHOD AND SYSTEM FOR ENHANCED BACKUP DATABASE INDEXING" filed on the same date as the present application and commonly owned. The cross-referenced application is incorporated herein by reference.

FIELD OF THE INVENTION

The embodiments of the invention relate to a method and system for improving indexing performance for databases used for backup storage. Specifically, the embodiments relate to a method and system for reducing the overhead during a backup process and a file recovery process associated therewith.

BACKGROUND

Enterprises utilize backup storage systems to protect data on their computer systems from loss by copying the data of the computer system and storing it at the backup storage system. The process relies on a client application being executed at each computer system to be backed up to the backup storage system. The client marshals the data to be backed up and transmits it to a backup server that stores it in a set of storage devices local to or in communication with the backup server.

Due to the large amounts of data to be backed up, the backup server and client may deduplicate the backed up data, compress the backed up data and similarly reduce the amount of storage required for the backed up data. Similarly, the backup client can be selective in the data sent to the backup server by sending only data that has changed since the last backup operation or by compressing the data. The communication between the backup client and the backup server or the backup storage devices can be compliant with the network data management protocol (NDMP).

The backup client can support the recovery of the backed up data allowing a user to select files from the backed up data and then sending the selected data to the backup client. To facilitate this functionality the backup server maintains an index of the files that can be separately retrieved from the backup storage system. The index is created as the files are received from the backup client. The indexing of the data can also be facilitated by the backup client where the backup client sends index information separate from the file data to be backed up. At the backup server the index data is stored in an index database ("indexdb"). In the case where NDMP is utilized, the indexes generated at the backup client and sent to backup server by NDMP are usually out of order (not in depth first order) and then it becomes necessary to convert these indexes into ordered indexes so that they can be committed to the indexdb.

There is an overhead of converting out of order indexes to ordered indexes. There is a temporary space overhead, a central processing unit (CPU) overhead, and memory overhead. In typical NDMP based backups this overhead or additional processing time is in measured in hours post backup. For example, in cases where there are 10 million files to be indexed, the reordering process can take 40 minutes, 20 million files takes 1 Hour 20 minutes, and 30 million files takes 2 Hours 5 minutes. The time increases linearly with the increase in number of files. Huge file systems with 100s of millions of files are common now and index reordering processing time can have a very big impact on total time for the backup. In addition to the time for this processing there is significant storage space required to track the files to be indexed. For example, the amount of space required can be: 2*(144+average file name length)*number of entries in the file system.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. A 'set,' as used herein refers to any positive whole number of items including one item.

The embodiments provide an enhanced index management system and process. The advantages of the enhanced index management process include removing intermediate index processing steps that are otherwise required for block or node based backup processes. The enhanced index management system and process including the index database in the system supports the receipt of any out of order indexes from backup clients. The system and process remove temporary memory space requirements to carry out any intermediate processing. As a result of the reduced memory and processing overhead of the enhanced index management system and process in comparison to standard reordering of index data, the embodiments are highly scalable to support millions of files (e.g., including hundreds of millions of files).

Figure 1:
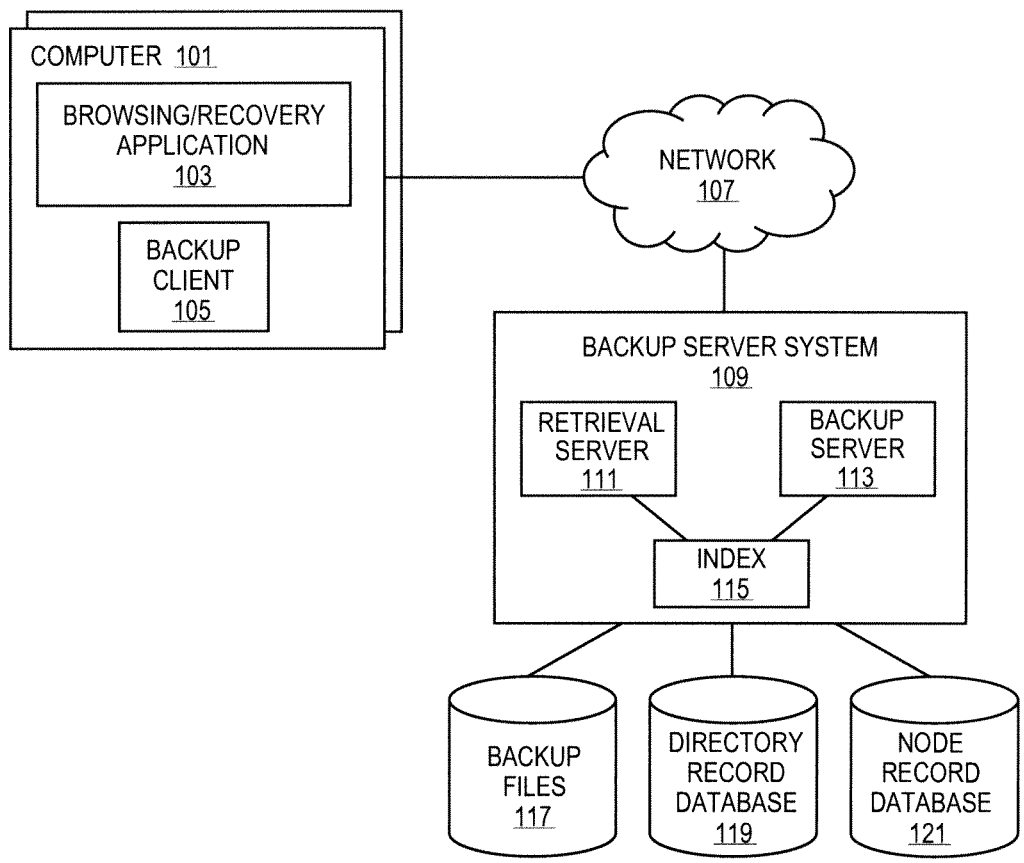
FIG. 1 is a diagram of one embodiment of backup storage system.

FIG. 1 is a diagram of one embodiment of backup storage system. The backup storage system can include a backup server system 109 and a set of computers 101 that are serviced by the backup server system 109. The set of computers 101 can be any type of computing device having data stored therein that can be backed up to the backup server system 109. The computer system 101 can be a desktop computer, server, network appliance, console device or similar computing device. Any number of separate and independent computer systems 101 can connect with the back server system 109 to have their data backed up therein. The computer system 101 can execute a backup client 105 that prepares and transmits the data to be backed up to the backup server system 109. The backup client 105 can implement NDMP or similar protocol to prepare and send data to the backup server system 109. The computer system 101 can also implement a browser or recovery application 103. The browsing or recovery application 103 can generate a user interface (e.g., a graphical user interface) that enables the traversal of the files stored in the backup server system and makes accessible the traversal of the index of these files at the backup server system 109. The example of the retrieval of 'files' is described herein for simplicity. However, one skilled in the art would understand that other types of data such as blocks and similar data structures can be managed as described herein and that the management of files through the enhanced indexing process is provided by way only of example and not limitation.

The set of computers 101 can communicate with the backup server system 109 over a network 107. The network 107 can be any type of communication network including a wired or wireless local area network ("LAN"), wide area networks ("WANS"), such as the Internet, and similar types of networks and combinations thereof. The network 107 can include any number of intermediate network nodes that enable communication between the set of computers 101 and the backup server system 109.

The backup server system 109 can include a set of processors such as central processing units (CPUs), memory devices, busses and similar components that communicator with one another across a mainboard or over a local network in a distributed process or similar configuration. These components of the backup server system 109 combine to execute a retrieval server 111, a backup server 113 and an index module 115. The index module 115 can implement the indexing database, the traversal of the index and similar queries related to the use of the index. The retrieval server 111 communicates with the browsing/recovery application 103 on the set of computers 101 to facilitate the retrieval of files or similar data from the backup files 117. Recovery applications 103 will query the retrieval server 111 using the full name and savetime of the desired file. The retrieval server 111 and index module 115 look up the directory records in the directory records database using savetime and the filename (e.g., may split the full name) till the last entry in the path is reached. Once full path is traversed recovery application and retrieval server record the mode number of the file being looked up. The inode is used to query the node record database for that savetime. The functions of the retrieval server 111 are described herein below in regard to FIG. 5.

The backup server 113 communicates with the backup client 105 of each of the computer systems 101 to receive the data to be backed up and to sort the data into data to be stored with the backup files 117, and backup meta-data including meta-data to be added to the directory record database 119 and meta-data to be stored in the node record database 121. The backup server system 109 can be any type of computing system such as a server (including a distributed system), workstation, console device, network appliance or similar computing system.

Backup clients 105, as soon as they receive, gather or otherwise marshal the files to be backed up, send them to the backup server 113 as file data and meta-data. The backup server 113 will commit the received data and meta-data to the relevant database depending on the type of information received. A new database will be created to store the node records for each backup (savetime) instance. The process of the backup server 113 is described further in regard to FIG. 2.

The backup server 113 maintains a set of persistent databases including, persistent backup file storage 117, the directory record database 119, and the node record database 121. The backup files 117 can be stored in a singular storage device or distributed over an array of such devices. The backup files 117 are the actual data backed up for each of the computer systems 101. The backup files 117 can maintain separate sets of data files for a particular client, computer system 101 or savetime instance. A savetime instance is a logical set of data that corresponds to a particular backup of the computer system 101. The savetime instance can refer to other or prior data to avoid having to repeatedly store the same information. In one embodiment, one database per backup (savetime) instance is maintained to store node entries per file backed up in a particular backup session. An inode number (or equivalent) will be the primary key for this database The directory record database 119 contains records compiled by the backup process that updates a record on a per client basis of which filename is associated with particular mode and pnodes as well as a filename and savetime. An inode is a file system data structure that stores all the information about a file system object except its data content and file name. A pnode is the parent inode of the mode in the record. One directory record database per client is maintained to store all the directory record entries. No primary key needs to be maintained for this database. A query can be constructed for any attributes of this database based on requirements. One database per client is maintained to store the directory records. Each entry in the database will have savetime along with the directory entries. Directory records per file can be duplicated in directory record database across different backups.

The node record database 121 stores records for each node in a file system or similar data structures such that each node record includes inode, statistical attributes and similar data about the file, block or similarly stored information. One database per savetime (backup) instance can be maintained to store all the node records entries indexed by the inode.

In further embodiments, the maintenance of databases like the purging of an index can be done easily by querying the directory record database for the given savetime and then deleting the node record database for that savetime. In other embodiments, a file based backup solution can be extended to support this enhanced index and file retrieval processes by a suitable mechanism. For example, by deriving a unique hash number using the directory name and full name of the file. These numbers can be used in place of the pnode and inode.

Figure 2:
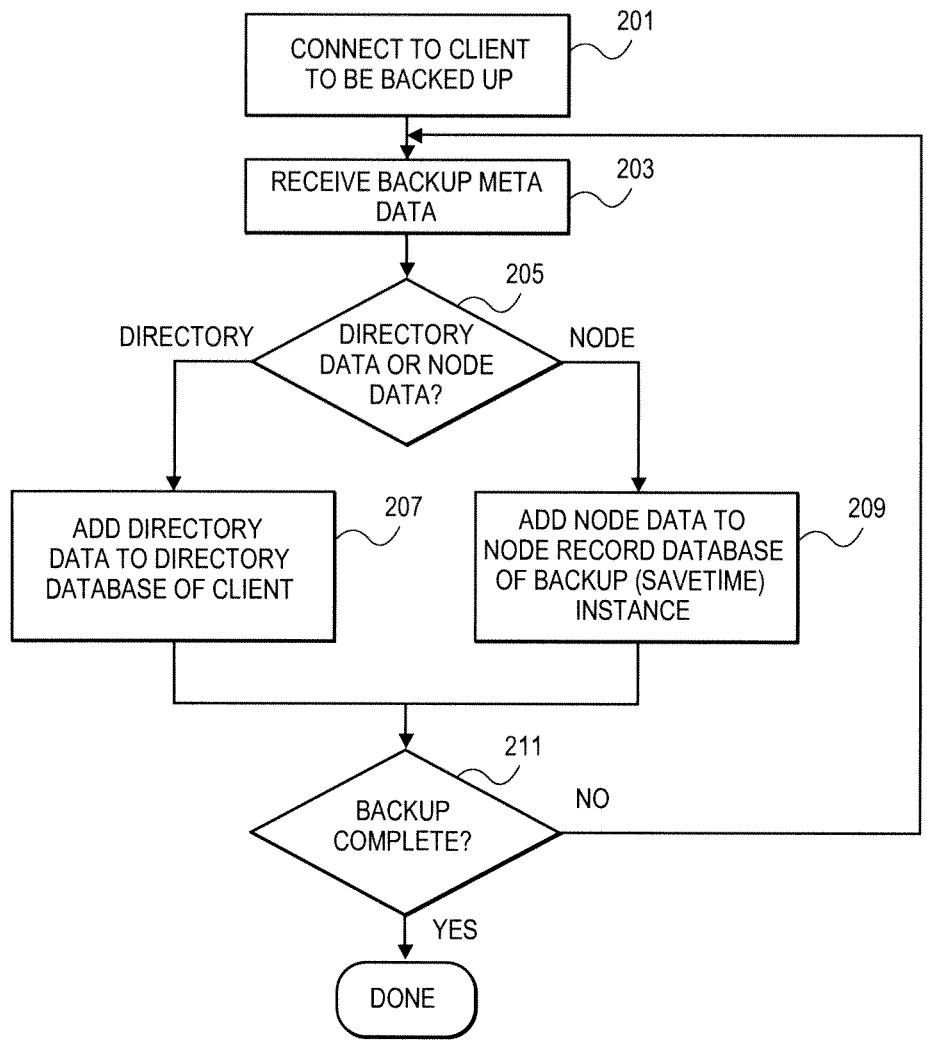
FIG. 2 is a flowchart of one embodiment of a process for creating a directory database and record database.

FIG. 2 is a flowchart of one embodiment of a process for creating a directory database and record database. In one embodiment, as the backup client 105 sends backup data to the backup server system through the backup server to be stored in the backup file, the backup server checks for index related data (i.e., backup meta-data, used herein interchangeably) to be properly stored in the directory record database or the node record database. In one embodiment, the process is initiated by the connection of the client computer system via the backup client application to the backup server (block 201). The backup client then starts marshaling and transmitting the data to be backed up including indexing data or backup meta-data (Block 203). The backup client, instead of generating standard backup meta-data or indexing data that may arrive out of order and requiring an ordering process, generates directory data or node data that is detected as backup-meta data by the backup server (Block 205). The format of the directory records and node records are described below in regard to FIG. 3.

Directory data that is received is added to the directory record database of the client (i.e., the database specific to the computer system or similar client sending the data) (Block 207). A separate database is maintained for each client and has a one to many relationship with the node record databases that are created for each backup (savetime) instance. The detected node data is stored in the node record database of the backup (savetime) instance created for the particular session that the backup client is currently executing (Block 209). A check is made whether the backup process has completed where all data to be backed up and all meta data including directory data and node data have been received (Block 211). If all of the data has been received then the current backup session has completed. However, if there is additional data to be received then the process continues to look for director and node data (Block 205). Thus, the process provides for receiving and committing backup meta-data such as directory records and node records prior to the completion of the backup process as the data is received, which does not require a costly reordering process and the associated overhead.

Figure 3:
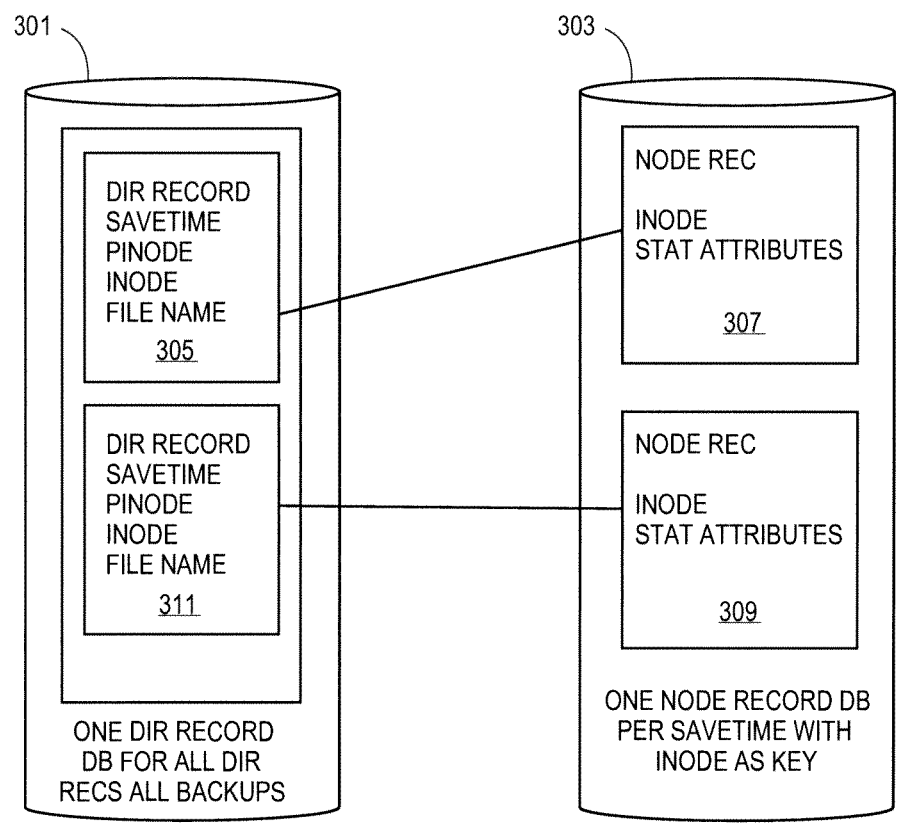
FIG. 3 is a diagram of one embodiment of a database schema for the enhanced indexing process.

FIG. 3 is a diagram of one embodiment of a database schema for the enhanced indexing process. The database schema illustrated in FIG. 3 is developed to accommodate the following sequence seen with the use of NDMP or block (dump) based backups. Generally as a part of file index two records are created per file backed up from the file meta-data. They are a directory record and a node record. Directory records 305, 311 have information as in the directory of a file system. They contain the inode number of the file being backed up, parent inode ("pnode") of the file and name of the file (i.e., the filename, thought the filename may not be complete). Node records 307, 300 have the attributes of a file indexed by an inode. To have the complete index information it is necessary to merge both records. It should be noted that using NDMP and similar protocols for transmitting these directory and node records that both records per file can come in any order like directory record being received followed by the corresponding node record or vice versa. By maintaining separate databases 301, 303 for each type of record as shown in FIG. 3 and described herein, the overhead of tracking and matching these records to merge them into an index database entry is avoided. The merged information is not needed until a file is to be recovered and the embodiments provide a mechanism as described herein below to accomplish this at the time of the recovery. Since few files are typically recovered, the increased resources for the recovery process offer a good trade-off from the unavoidable overhead of merging the files to form an index previously utilized. Thus, this process and system is more scalable and faster than a comparable process that reorders the index data and commits it after the backup has completed.

Figure 4:
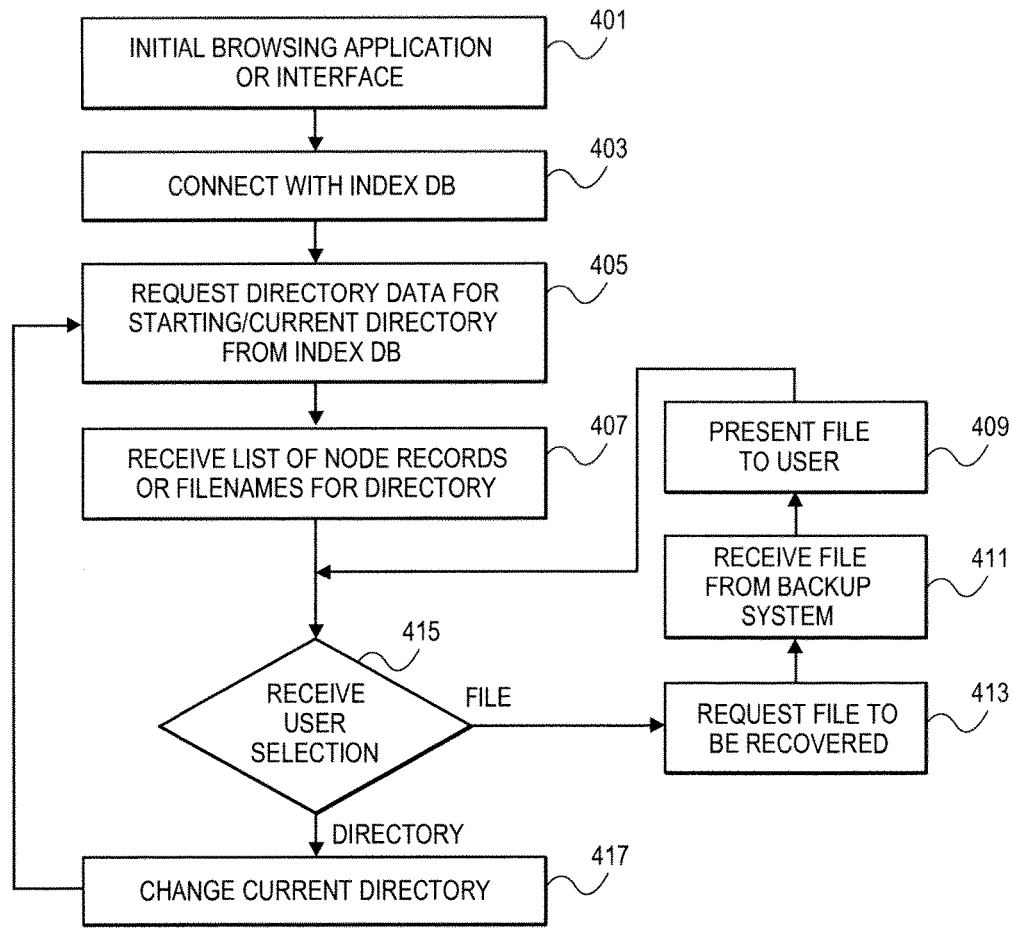
FIG. 4 is a flowchart of one embodiment of an index traversal process.

FIG. 4 is a flowchart of one embodiment of an index traversal process. In one embodiment, the retrieval of a file starts with a user traversing a file system to located and select the file. This process is driven by the browsing/recovery application at the client computer system. The browsing application or interface is generated and presented to the user (Block 401). The initial starting point can be pre-defined or user selected such as a drive designator or similar indicator. The browsing application connects with the indexing module or retrieval server which generates an index database from merging director records and node records (Block 403). The browsing application requests the directory data for the above-mentioned starting director or location (Block 405). This current directory is sent to the retrieval server, which returns a list of node records or file names in the current directory (Block 407). (The server side generation of this list is described herein below in regard to FIG. 5)

With the file or node records displayed (it should be noted that a 'file' here may in fact be a sub-directory or similar structure), the user can input a selection from the offered choices (Block 415). If the file or node that is selected corresponds to a directory (Block 417), then the current directory is changed and requested from the retrieval server (Block 405). If, however, the selected file is not a director, the request for the backed up file is made (Block 413). The requested file will be received from the retrieval server (Block 411) and the returned file can be presented to the user through the graphical user interface of the browsing application or through a similar mechanism (Block 409). This process can continue if the user wants to select additional files for retrieval (Block 415).

Figure 5:
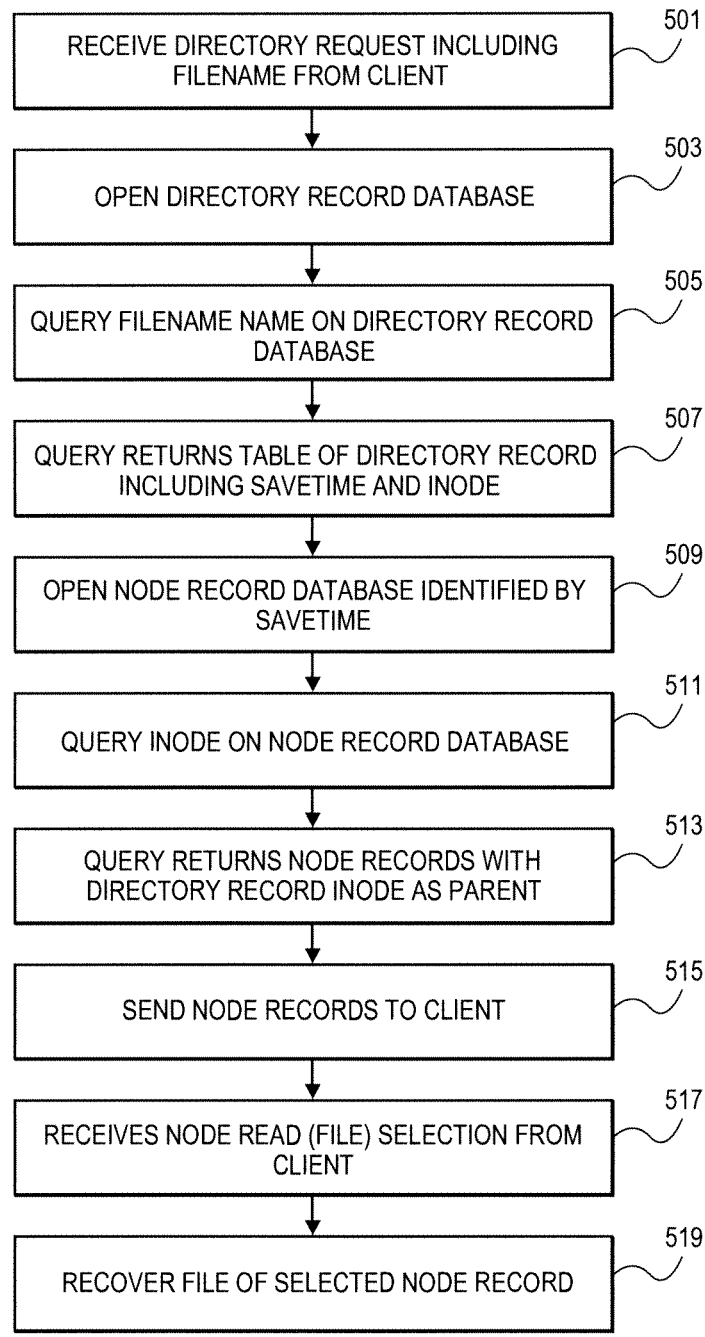
FIG. 5 is a flowchart of one example embodiment of a process for indexed file retrieval.

FIG. 5 is a flowchart of one example embodiment of a process for indexed file retrieval. This portion of the retrieval process is executed at the backup server system by the retrieval server or similar component. This process is initiated in response to receiving a directory request or file request from the backup client or browsing application of the client computer (Block 501). The request will include a file name and a backup instance (savetime) identifier. The directory record database for the client will be located and opened (Block 503). The client computer can be identified through the retrieval session, a special identifier utilized by the client computer or similar identification mechanism.

The retrieval server uses the index module to query the filename that was received to find the corresponding directory record in the directory record database (Block 505). There will be only one record that matches a given filename. The directory record of the matching filename is returned by the query (Block 507). The directory record includes the mode and pnode associated with the filename. This information can then be utilized to query the node record database. The node record database corresponding to the desired backup (savetime) instance is opened (Block 509). A query can then be executed by the index module to obtain all node records where their directory record pnode is the mode of the directory record with the matching filename, thus all the children node records are returned (Block 513). These children node records represent the files of the requested directory or the nodes that make of the requested file. These node records or the filenames corresponding thereto, which can be obtained from their directory record, are then returned to the browsing application (Block 515). The file or directory is then displayed to the user and the retrieval server awaits its next request for a directory (Block 501) or a file (Block 517). If a file is requested then the backup data in the backup database corresponding to the node records is retrieved and returned.

In this process the directory record database and node record database are used in conjunction in place of the traditional indexdb. However, one skilled in the art would understand that the examples are provided by way of illustration and not limitation and that the principles and structures are also applicable to similar data retrieval schemes.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer-readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of managing file recovery for a plurality of clients, the method comprising:
   receiving a file or a directory recovery request for a desired file or a desired directory from a client, the file or directory recovery request identifying the client via a session identifier utilized by a client computer, a filename and a savetime, wherein the savetime is associated with a desired backup instance and the filename is associated with a desired file or directory of the desired backup instance to be retrieved from a backup system, wherein the backup system is a Network Data Management Protocol (NDMP) based backup system without an index database (indexdb) to eliminate index reordering associated with an indexdb;
   querying the filename and the savetime on a directory records database that contains directory records for only the client specified in the file or directory recovery request, wherein the directory records database is a persistent database that stores directory records for a plurality of backup instances of the client that have been previously backed up and stored in the NDMP based backup system, wherein the directory records database for the client has no primary key;
   receiving, as a query return from the directory records database, a directory record including the savetime identifying the desired backup instance, a pnode identifier identifying a parent directory associated with the filename and an inode identifier identifying the desired file or directory associated with the filename;
   querying the inode identifier on a node records database that contains node records for only the backup instance of the client identified by the savetime, wherein the node records database uses an inode identifier database field as a primary key, wherein the node records database is a database different from the directory records database;
   receiving at least one node record where the node record is associated with the desired file or directory of the desired backup instance, wherein the at least one node record is utilized to retrieve attributes of the desired file or directory of the desired backup instance from the NDMP based backup system;
   merging the directory record and a node record of the at least one node record; and
   sending the merged directory record and node record to the client.

2. The method of claim 1, wherein:
   the desired file or directory of the desired backup instance is associated with a directory record and at least one node record.

3. A non-transitory computer-readable storage medium having instructions stored therein, which when executed cause a set of operations to be performed by a computer system to manage file recovery for a plurality of clients, the set of operations comprising:
   receiving a file or a directory recovery request for a desired file or a desired directory from a client, the file or directory recovery request identifying the client via a session identifier utilized by a client computer, a filename and a savetime, wherein the savetime is associated with a desired backup instance and the filename is associated with a desired file or directory of the desired backup instance to be retrieved from a backup system, wherein the backup system is a Network Data Management Protocol (NDMP) based backup system without an index database (indexdb) to eliminate index reordering associated with an indexdb;
   querying the filename and the savetime on a directory records database that contains directory records for only the client specified in the file recovery request, wherein the directory records database is a persistent database that stores directory records for a plurality of backup instances of the client that have been previously backed up and stored in the NDMP based backup system, wherein the directory records database has no primary key;

receiving, as a query return from the directory records database, a directory record including the savetime identifying the desired backup instance, a pnode identifier identifying a parent directory associated with the filename and an inode identifier identifying the desired file associated with the filename;

querying the inode identifier on a node records database that contains node records for only the backup instance of the client identified by the savetime, wherein the node records database uses an inode identifier database field as a primary key, wherein the node records database is a database different from the directory records database; and receiving at least one node record where the node record is associated with the desired file or directory of the desired backup instance, wherein the at least one node record is utilized to retrieve attributes of the desired file or directory of the desired backup instance from the NDMP based backup system;

merging the directory record and a node record of the at least one node record; and sending the merged directory record and node record to the client.

4. The non-transitory computer readable storage medium of claim 3, wherein:

the desired file or directory of the desired backup instance is associated with a directory record and at least one node record.

5. A computer system comprising a memory and at least one hardware processor, the memory containing executable instructions that, when executed by the at least one hardware processor, implements a file recovery system for a plurality of clients having operations comprising:

receiving a file or a directory recovery request for a desired file or a desired directory from a client, the file or directory recovery request identifying the client via a session identifier utilized by a client computer, a filename and a savetime, wherein the savetime is associated with a desired backup instance and the filename is associated with a desired file or directory of the desired backup instance to be retrieved from a backup system, wherein the backup system is a Network Data Management Protocol (NDMP) based backup system without an index database (indexdb) to eliminate index reordering associated with an indexdb;

querying the filename and the savetime on a directory records database that contains directory records for only the client specified in the file or directory recovery request, wherein the directory records database is a persistent database that stores directory records for a plurality of backup instances of the client that have been previously backed up and stored in the NDMP based backup system, wherein the directory records database has no primary key;

receiving, as a query return from the directory records database, a directory record including the savetime identifying the desired backup instance, a pnode identifier identifying a parent directory associated with the filename and an inode identifier identifying the desired file or directory associated with the filename;

querying the inode identifier on a node records database that contains node records for only the backup instance of the client identified by the savetime, wherein the node records database uses an inode identifier database field as a primary key, wherein the node records database is a database different from the directory records database; and receiving at least one node record where the node record is associated with the desired file or directory of the desired backup instance, wherein the at least one node record is utilized to retrieve attributes of the desired file or directory of the desired backup instance from the NDMP based backup system;

merging the directory record and a node record of the at least one node record; and sending the merged directory record and node record to the client.

6. The computer system of claim 5, wherein:

the desired file or directory of the desired backup instance is associated with a directory record and at least one node record.

7. The computer system of claim 5, wherein the pnode identifier identifying the parent directory associated with the filename further comprises a unique hash value derived from the parent directory associated with the filename, wherein the inode identifier associated with the desired file further comprises a unique hash value derived from the filename.

8. The computer system of claim 5, further comprising a plurality of directory records databases maintained in a persistent storage device, each directory records database corresponding to one of a plurality of clients that transmit backup data, wherein each of the directory records databases includes a plurality of directory records, each directory record in each directory records database of the plurality of directory records databases corresponding to a particular backup instance of a corresponding client and identifying one of a plurality of node records databases of the corresponding client that are associated with a plurality of backup instances of the corresponding client.

9. The computer system of claim 5, wherein when a new backup instance is received from the client, a new directory record is created in a directory records database of the client and a new node records database is created and referenced by the new directory record, and wherein when an existing backup instance of the client is purged, a directory record of a directory records database of the client is removed and a node records database of the client associated with the removed directory record is deleted.

10. The method of claim 1, wherein the pnode identifier further comprises a unique hash value derived from the parent directory associated with the filename, wherein the inode identifier further comprises a unique hash value derived from the filename.

11. The method of claim 1, further comprising maintaining a plurality of directory records databases in a persistent storage device, each directory records database corresponding to one of a plurality of clients that transmit backup data.

12. The method of claim 11, wherein each of the directory records databases includes a plurality of directory records, each directory record in each directory records database of the plurality of directory records databases corresponding to a particular backup instance of a corresponding client and identifying one of a plurality of node records databases of the corresponding client that are associated with a plurality of backup instances of the corresponding client.

13. The method of claim 1, wherein when a new backup instance is received from the client, a new directory record is created in a directory records database of the client and a new node records database of the client is created and referenced by the new directory record.

14. The method of claim 13, wherein when an existing backup instance of the client is purged, a directory record of a directory records database of the client is removed and a node records database associated with the removed directory record is deleted.

15. The non-transitory computer-readable storage medium of claim 3, wherein the pnode identifier further comprises a unique hash value derived from the parent directory associated with the filename, wherein the inode identifier further comprises a unique hash value derived from the filename.

16. The non-transitory computer-readable storage medium of claim 3, wherein operations further comprise maintaining a plurality of directory records databases maintained in a persistent storage device, each directory records database in the plurality of directory records databases corresponding to one of a plurality of clients that transmit backup data, wherein each of the directory records databases includes a plurality of directory records, each directory record in each directory records database of the plurality of directory records databases corresponding to a particular backup instance of a corresponding client and identifying one of a plurality of node records databases of the corresponding client that are associated with a plurality of backup instances of the corresponding client.

17. The non-transitory computer-readable storage medium of claim 16, wherein when a new backup instance is received from a client of a plurality of clients that transmit backup data, a new directory record is created in a directory records database of the client and a new node records database is created and referenced by the new directory record, and wherein when an existing backup instance of the client is purged, a directory record of a directory records database of the client is removed and a node records database of the client associated with the removed directory record is deleted.

* * * * *